United States Patent
Oudalov et al.

(10) Patent No.: US 9,887,531 B2
(45) Date of Patent: Feb. 6, 2018

(54) ADAPTIVE PROTECTION FOR DISTRIBUTION GRID BASED ON AREA CONCEPT

(71) Applicant: ABB Research LTD, Zurich (CH)

(72) Inventors: Alexandre Oudalov, Fislisbach (CH); Antonio Fidigatti, Spino d'Adda (IT); Dmitry Ishchenko, Cary, NC (US); Enrico Ragaini, Bergamo (IT); James Stoupis, Durham, NC (US); Luca Milani, Zogno (IT)

(73) Assignee: ABB Research LTD, Zurich (CH)

( * ) Notice: Subject to any disclaimer, the term of this patent is extended or adjusted under 35 U.S.C. 154(b) by 205 days.

(21) Appl. No.: 14/910,300

(22) PCT Filed: Apr. 30, 2014

(86) PCT No.: PCT/EP2014/058885
§ 371 (c)(1),
(2) Date: Feb. 5, 2016

(87) PCT Pub. No.: WO2015/024676
PCT Pub. Date: Feb. 26, 2015

(65) Prior Publication Data
US 2016/0190790 A1    Jun. 30, 2016

Related U.S. Application Data

(60) Provisional application No. 61/869,449, filed on Aug. 23, 2013.

(51) Int. Cl.
*H02H 3/00* (2006.01)
*H02H 7/28* (2006.01)
*H02H 3/08* (2006.01)

(52) U.S. Cl.
CPC .............. *H02H 3/006* (2013.01); *H02H 3/08* (2013.01); *H02H 7/28* (2013.01)

(58) Field of Classification Search
CPC ..................................................... H02H 3/006
(Continued)

(56) References Cited

U.S. PATENT DOCUMENTS

| 7,277,779 B2 * | 10/2007 | Zima .................... G05B 13/048 323/207 |
| 7,693,608 B2 * | 4/2010 | Nasle ..................... G05B 17/02 323/212 |

(Continued)

OTHER PUBLICATIONS

Shateri H et al.: "Measured impedance at source node of a distribution feeder with distributed loads", Power and Energy Society General Meeting—Conversion and Delivery Of Electrical Energy in the 21st Century, 2008, IEEE, IEEE, Piscataway, NJ, USA, Jul. 20, 2008, pp. 1-7.

(Continued)

*Primary Examiner* — Stephen W Jackson
(74) *Attorney, Agent, or Firm* — Manelli Selter PLLC; Edward J. Stemberger

(57) ABSTRACT

Method of protecting a distribution network with a line interconnecting busbars, each busbar being connectable, by means of switching devices adjacent to the busbar, to the line and to loads and/or generators. The method divides the distribution network in multiple protection areas, each comprises a busbar, a protection device and an area controller. Upon a change in connect status of a distribution feeder line, load or generator connectable to one of the busbar, the logic controller in this protection area re-calculates the short circuit level of the areas. Based on the recalculated short circuit levels, the protection settings of the areas may be adapted. The embodiment also provides a system and computer program product adapted to perform the method.

16 Claims, 6 Drawing Sheets

(58) Field of Classification Search
USPC .......................................................... 361/66
See application file for complete search history.

(56) References Cited

U.S. PATENT DOCUMENTS

| | | | | |
|---|---|---|---|---|
| 8,577,661 B2* | 11/2013 | Nasle | ..................... | G05B 17/02 |
| | | | | 700/286 |
| 8,621,117 B2* | 12/2013 | Stoupis | ................. | H02J 13/001 |
| | | | | 710/10 |
| 8,688,429 B2* | 4/2014 | Nasle | ..................... | G05B 17/02 |
| | | | | 361/42 |
| 2013/0066478 A1 | 3/2013 | Smith | | |

OTHER PUBLICATIONS

International Search Report & Written Opinion in PCT/EP2014/058885 dated Jul. 7, 2014.

* cited by examiner

US 9,887,531 B2

ADAPTIVE PROTECTION FOR DISTRIBUTION GRID BASED ON AREA CONCEPT

FIELD OF THE INVENTION

The invention relates to a method for decentralized protection of active distribution networks, in particular, of the networks in which a dynamic adjustment of the protection settings is required.

BACKGROUND OF THE INVENTION

The traditional distribution grid is a passive grid without local energy sources and is fully supplied by the transmission grid. Due to increased industry focus on renewable sources small and medium size distributed energy resources, DER, appeared in the distribution grid. And their amount is expected to grow mainly driven by environmental and reliability concerns.

Distribution grids with a large amount of DER may also benefit from the adoption of normally closed loop/meshed topologies in opposition to the dominant radial scheme. These topologies will have positive effects on power losses, voltage regulation and network reliability. Finally with a large amount of controllable and coordinated DER a part of the distribution grid can intentionally disconnect from the main grid in emergency cases and continue operation in the islanded mode. This concept is known as a microgrid.

This evolutionary transformation makes distribution grids more active but it will also face many technical challenges. And one important aspect is protection of microgrids. The existing protection systems are designed for a traditional passive distribution grid with fixed settings and may act inadequately in constantly changing operating conditions of microgrid. This includes for instance changes in the magnitude and direction of short circuit currents, e.g. DER on/off, network configuration including islanding; reduction of fault detection sensitivity and speed in tapped DER connections; unnecessary tripping of utility breaker for faults in adjacent lines due to fault contribution of the DER; and Auto-reclosing of the utility line breaker policies may fail. The following proposals are developed with consideration of some of above aspects.

WO 2010/063816 describes a method and an apparatus for adapting at least one set of parameters to at least one Intelligent Electronic Device of an electrical power network having a plurality of switching devices. The method comprises the steps of: a) reading the current network status of the electrical power network, wherein the network status includes the status of the plurality of switching devices; b) simulating at least one network fault in the electrical power network; c) deducing at least one new set of parameters for the at least one Intelligent Electronic Device using a simulated fault current induced by the at least one simulated network fault under consideration of the current network status and the network topology of the electrical power network; d) setting the at least one set of parameters in at least one of the at least one Intelligent Electronic Device. A similar approach is described by Oudalov A., Fidigatti A., Adaptive Network Protection in Microgrids, Int. Journal of Distributed Energy Resources, Vol. 4, No. 3, pp. 201-225, 2009.

U.S. Pat. No. 7,525,782 describes an adaptive protection process for processing circuit breaker information that continuously monitors itself for changes so that as the state of the power distribution system changes. The adaptive protection algorithm traces flow of power through a circuit breaker system and assigns a value or rank to each circuit breaker based on its relative closeness to power sources and end loads. The rankings assigned to the breakers are used to determine the response time for each breaker to ensure system coordination and selectivity.

WO/2013/036385 describes a centralized coordination of setting and adjusting trip settings of electronic circuit breakers in an electrical distribution system by monitoring short circuit current availability, SCCA, and adjusting trip settings based on received SCCA estimates from SCCA monitoring devices installed at main, feeder, and branch nodes of the distribution system. The document concerns merely distribution system having multiple loads but not distributed energy resources. Thus, the changes of the short circuit levels are not that complex as in a distributed network having not only multiple loads but also distributed energy resource.

DESCRIPTION OF THE INVENTION

The above mentioned proposals focus on the centralized system where a central controller communicates with local devices and takes decisions. This method can work well in a small scale microgrid but may not be applicable in a distribution system which spans over large geographic area and have a large number of switches, particularly, for distributed network having multiple loads and distributed energy resources where protection is much sophisticated due to the dynamic change of the distribution network.

It is therefore an objective of the invention to provide a method for a decentralized protection of active distribution networks, which supports local protection system adaptation based on distributed logic. The method should be able to dynamically adjust protection settings in different parts of the network to follow its topological changes without a need to know a complete system topology, reduce the loading of communication infrastructure which links different parts of the network, and enable an automatic system adjustment after integration of new distributed generators or feeder extension.

This objective is achieved by a method and a system according to the independent claims. Preferred embodiments are evident from the dependent patent claims.

The present invention provides a method of protecting a distribution network with a power line interconnecting a first busbar and a second busbar, each busbar being connectable, by means of switching devices adjacent to the busbar, to the line and to loads and/or generators, wherein the method comprises the steps of: identifying a first and a second protection area comprising respectively the first and the second busbar, protected respectively by a first and a second protection device such as an intelligent electronic device, and being delimited by the adjacent switching devices; assigning a first and a second logic controller to the first and the second protection area, respectively; evaluating, for an initial grid topology defined by a connect status of the switching devices, a first and second short circuit level for the first and second protection area, by the first and the second logic controller respectively; upon a change in connect status of a distribution feeder line, load or generator connectable to the first busbar, re-evaluating the first short circuit level by the first logic controller, and preferably adapting protection settings of the first protection device based on the re-evaluated first short circuit level, and re-evaluating the second short circuit level based on the re-evaluated first short circuit level by the second logic controller; and adapting protection settings of the second protection device based on the re-evaluated second short circuit level.

The distance between the first and second protection areas usually depends on voltage level. For instance, in medium voltage, the distance may be more than 100 m, particularly more than 1 km, more particularly between 20 and 50 km; and in low voltage the distances between the busbars and switching terminals may be shorter, e.g. 20 m to 1 or 2 km. The number of the switches in distributed network according to the present invention is usually several hundred, particularly several thousand, more particularly several ten thousand.

This re-evaluated first short circuit level constitutes the only re-fault information from the first protection area provided to the second logic controller.

Preferably, the adaptation of the first protection settings may also be performed at the same time as the adaptation of the second protection settings.

Hereinafter, the term logic controller is also called local logic controller or area controller for a protection area.

According to a preferred embodiment, the evaluation and re-evaluation is performed by calculating based on use of the MVA method. The acronym MVA is the unit of power, i.e. mega volt ampere.

Preferably, the first logic controller communicates the re-revaluated first short circuit level to the second logic controller via a communication channel or link such as switched communication network, hardwired communication line, wireless or existing power line.

The distribution network may comprise a plurality of further busbars each associated to a particular protection area. In this case, the step of re-evaluating of the short circuit levels will be propagated, upon a change in connect status of loads or generators connectable to the first and the second busbar. Then, the adaptation of the protection settings of the first, the second and the further protection device can be aggregated. This means, the method according to the present invention is applicable for the case when the status of multiple loads or generator belonging to several protection areas changes simultaneously.

Preferably, a group of settings for protection devices can be determined, wherein each setting corresponds to a range of the short circuit level.

Preferably, the step of adapting the protection settings is carried out by selecting the protection setting corresponding to the re-evaluated short circuit level from the group of settings.

Alternatively, the settings may also be calculated in real time immediately after configuration change to a new mode. In this case, the pre-calculated and validated group of settings is not required. The configuration change on/off generator, load, line which leads to a change in available short circuit power. After changed had happened and new configuration is known, the system can run fault analysis simulations and verify if fault sensitivity and selectivity between protection devices are as required. In case that protection devices do not perform as expected, the system may calculate new settings which will satisfy above mentioned requirements.

Preferably, upon a fault in the distribution network, the fault direction for the first and the second protection area may be detected so the fault location can be estimated, e.g. the fault is inside or outside of a particular protection area. Accordingly, the switching devices delimiting that particular protection area can be disconnected, i.e. open, thereby the fault is isolated. This avoids unnecessary disconnection of components in protection areas, loads or generators which are not affected by the fault. In addition, the information about location of the fault, i.e. in which area did the fault occur, can be propagated to other switching devices on the boundary of the area where the fault is located, allowing such area to be disconnected completely from the rest of the electrical system.

The boundary of an area might include circuits at different voltage levels, or with different wiring and grounding schemes, e.g. one phase vs. three phases, or with different frequencies or even partly AC and partly DC. Nevertheless, behaviour during the fault may be defined by the same strategy, i.e. detect if fault is inside or outside area, if it is inside tell all devices on the boundary to trip, if outside let the next in line know.

According to a further embodiment, the first and the second logical controller may be integrated with the first and the second protection device, respectively. In this case the geographical adjacent protection areas may share one local logical controller, thereby saving space for extra components. Moreover, several or all protection devices in one area may act as the area controller. This provides a redundancy of the area controller and increases the reliability.

According to a further aspect, the present invention also provides a system of protecting a distribution network with a line interconnecting a first busbar and a second busbar, each busbar being connectable, by means of switching devices adjacent to the busbar, to the line and to loads or generators. The system comprises: a first and a second protection area comprising respectively the first and the second busbar, protected respectively by a first and a second protection device, and being delimited by adjacent switching devices; a first and a second logic controller respectively connected to the first and the second protection area for calculating and recalculating the first and the second short circuit level. The first and the second logic controller are adapted to evaluate, for an initial grid topology defined by a connect status of the switching devices, a first and second short circuit level for the first and second protection area, respectively. The first and the second logic controller are adapted to re-evaluate the first short circuit level, upon a change in connect status of a distribution feeder line, load or generator connectable to the first busbar, and to re-evaluate the second short circuit level based on the re-evaluated first short circuit level, respectively. The system according to the present invention is adapted to adapt protection settings of the first and second protection device based on the re-evaluated first and second short circuit level, respectively.

The present invention also relates to a computer program product including computer program code for controlling one or more processors of a device adapted to carry out the above method, particularly, a computer program product including a computer readable medium containing therein the computer program code.

In summary, The present invention provides a method of protecting a distribution network with a line interconnecting busbars, each busbar being connectable, by means of switching devices adjacent to the busbar, to the line and to loads and/or generators. The method divides the distribution network in multiple protection areas, each comprises a busbar, a protection device and an area controller. Upon a change in connect status of a distribution feeder line, load or generator connectable to one of the busbar, the logic controllers in the protection areas re-calculate the short circuit level of the areas. Based on the recalculated short circuit levels, the protection settings of the areas may be adapted.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their primary meanings, are listed in summary form in the list of designations. In principle, identical parts are provided with the same reference symbols in the figures.

DETAILED DESCRIPTION OF PREFERRED EMBODIMENTS

Figure 1:
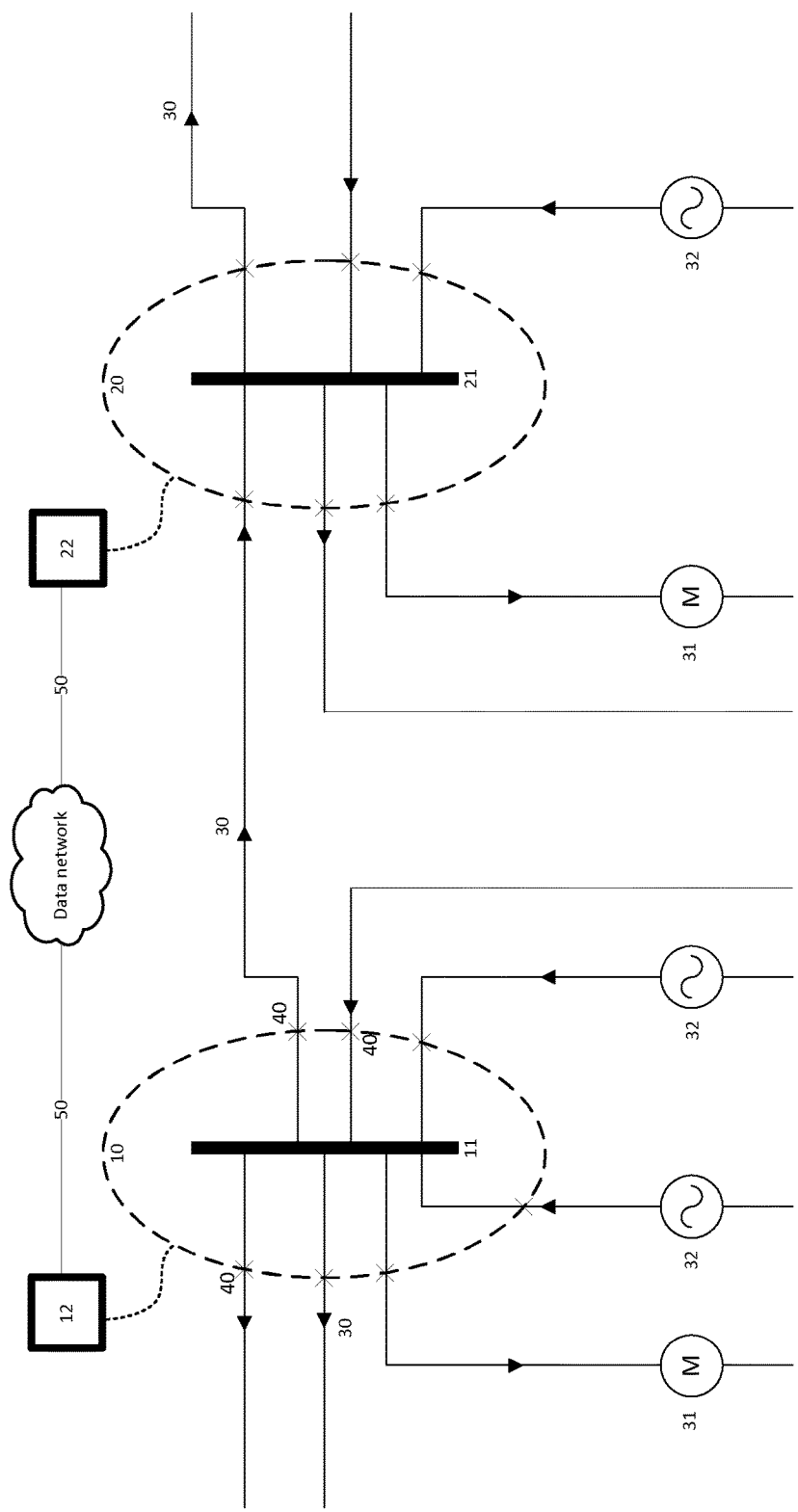
FIG. 1 schematically shows the first and the second protection areas according to the present invention, each comprising a busbar and a plurality of switch devices.

FIG. 1 shows an exemplary adaptive protection system based on protection area concept. The protection area 10 or 20 is defined as part of the distribution grid which is centered on the electrical node, i.e. bus, and has a virtual border which passes through the breakers controlled by electronic relays/IEDs closest to the electrical node 11 or 21.

Each protection area 10 is connected to at least one other area 20 in the same distribution grid by means of distribution lines 30 or transformers. It may also be connected to local generators 32 which inject fault current in case of the fault and loads 31 which can be passive or active (inject fault current), e.g. motors 31, during the fault.

The protection area 10 can be seen as a black box with connection ports, which can exchange power in normal and fault conditions with the direct neighboring areas via external ports and with its local generators 32 and loads 31 via internal ports. Each port is connected to a Local Logic (LL) controller 12 via bi-directional communication lines such as bus, hardwired, wireless, etc. The LL controller 12 can be physically a standalone device or embedded in local protection device which controls a switch at one of the ports in the protection area. The LL controller 12 can receive and send information from/to each port and also talk to the direct neighboring areas 20, in order to coordinate protection and emergency control actions, e.g. generation ramping, load shedding, etc.

The short circuit level within an electric power distribution system depends on the network topology and connectivity of short circuit power sources such as generators and active loads, e.g. motors. In order to evaluate the short circuit level in each protection area 10, 20 the present invention uses the MVA method. The MVA method for fault analysis is a modification of the Ohmic method, where each network component is replaced by a block representing the component's contribution to the short circuit level that is utility grid, generators and motors or a de-rating that is reduction of the short circuit level, i.e. overhead lines, underground cables and transformers, expressed in MVA. In order to calculate the MVA value of each component, the necessary rules are the following:

$$\text{utility grid} \rightarrow \frac{V^2_{line\text{-}to\text{-}line}}{X_{grid}}, \text{ or given by the utility}$$

$$\text{transformer} \rightarrow MVA_{tran} = \frac{MVA_{tran\text{-}nominal}}{X_{tran\text{-}p.u.}}$$

$$\text{generator} \rightarrow MVA_{gen} = \frac{MVA_{gen\text{-}nominal}}{X''_{gen\text{-}p.u.}}$$

$$\text{line} \rightarrow MVA_{line} = \frac{V^2_{line\text{-}to\text{-}line}}{X_{line}}$$

$$\text{motor} \rightarrow MVA_{mot} = \frac{MVA_{mot\text{-}nominal}}{X_{mot\text{-}p.u.}}$$

When the MVA diagram is traced, the short circuit MVA level can be calculated at a specific point, i.e. starting from this point different elements are combined as:

$$\text{series components} \rightarrow MVA_{1,2} = \frac{MVA_1 \cdot MVA_2}{MVA_1 + MVA_2} \quad (1)$$

$$\text{parallel components} \rightarrow MVA_{1,2} = MVA_1 + MVA_2 \quad (2)$$

Figure 2:
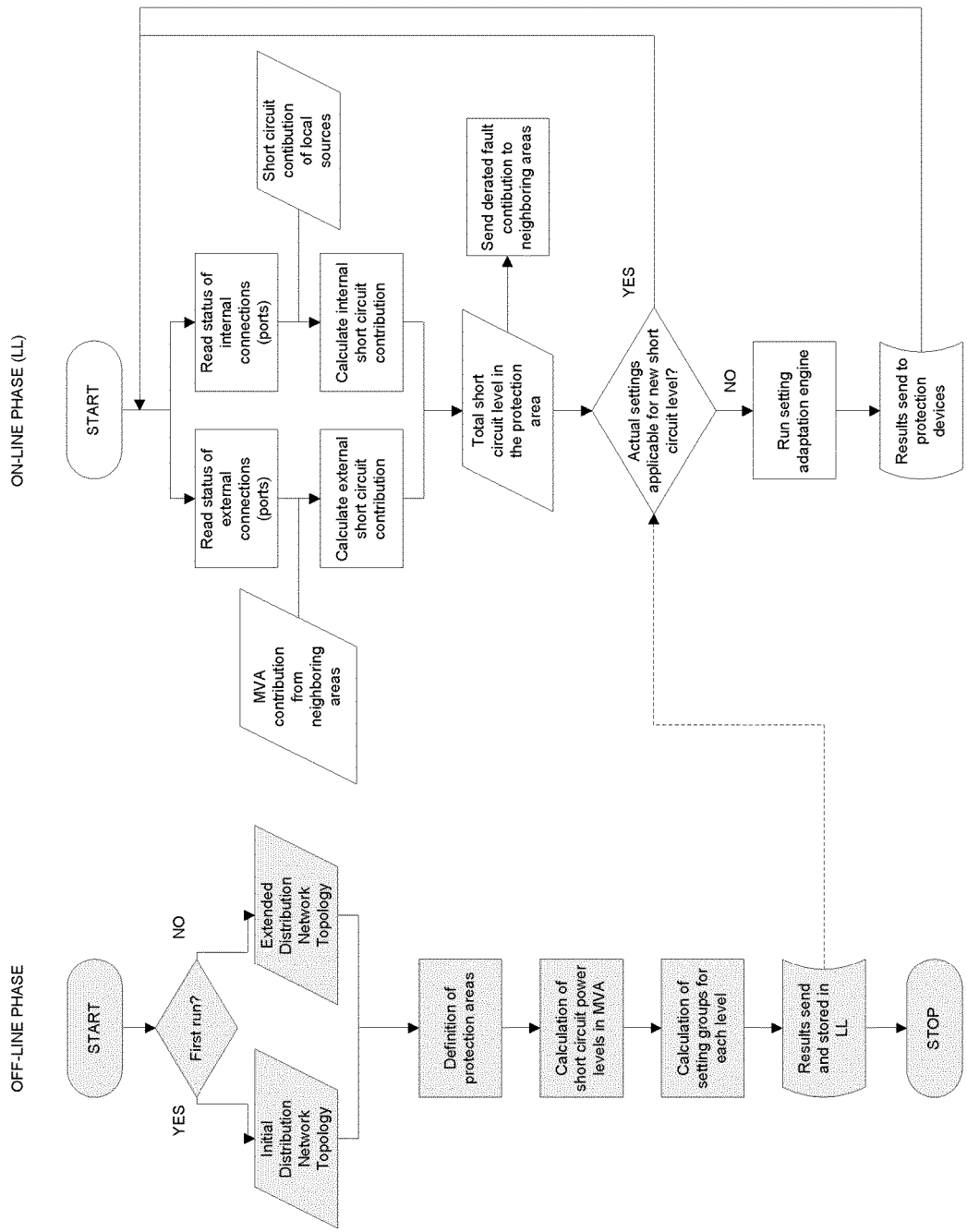
FIG. 2 schematically shows in its left part the offline and in its right part the online phases of the distributed protection setting adaptation process according to the present invention.

FIG. 2 shows the steps according to an exemplary embodiment of the present invention as the follows:

The actual available short circuit level, i.e. short circuit levels for different types of faults: three phase, ph-ph, phase to ground, in MVA is calculated for each area by knowing actual status of the external and internal ports that are open/close, assuming that parameters of local fault current sources and connecting lines or transformers including information about transformer connection, e.g. Y/Y, D/Y, etc., to the neighboring protection areas are known by the LL 12, 22.

In case of topological changes, e.g. a local generator 32 is switched on, first the area 10 where the generator is connected will update the level of available short circuit power in MVA and may update protection settings in first area and send the updated value of its potential fault contribution, e.g. to three phase fault or ph to ground fault, to the direct electrically connected neighboring areas where a re-calculation of available short circuit level is done again and is forwarded further. The updated value is de-rated by a connection link impedance which is a configuration parameter of the LL controller 12.

The LL 12 controller may decide what short circuit information to send to the direct neighbors, depending on the type of the neighbors, e.g. if there is a single phase tap then the LL 12 will only send phase to ground contribution. In case of the loop/ring topology all LL controllers 12, 22 located in the loop may exchange information between each other. A communication between neighbors is not sufficient since there are always two current paths between two areas in the loop in case of fault. In case loop networks are linked with a single connection, i.e. there is only one path for the fault contribution between two loops, each loop can be considered as a protection area with LL controller, cf. FIGS. 3a and 3b.

After a short circuit level is updated in a specific protection area, the LL verifies if the new fault level may affect a performance of the protection devices at external and internal ports in a negative way such as loss of selectivity, fault sensitivity and speed of operation.

In case the problem is identified at least for one local protection device the LL runs a protection setting adaptation engine which adjusts the actual relay settings to restore a correct operation of protection devices in the area and coordination with protection devices in the neighboring areas. It can use off-line calculated and verified "trusted" setting groups mapped to specific network topologies, e.g. via a lookup table. The alternative way can be to verify a selectivity of settings by running fault analysis in real time and analyze generated tripping signals. Then if need new settings can be calculated in real time as well. Depending on a type of protection function the "settings" may include: (i) threshold values of certain electrical parameters, (ii) various time delays, (iii) interlock and transfer trip connection directions that are hardwired or subscription lists, and (iv) activation of another protection function, etc. Alternatively, the adaptation can be done for several buses connected in the loop from the loop's LL.

The effect of distribution grid upgrades, e.g. connection of new fault current sources, feeder line extension, etc., on present short circuit levels should be examined centrally for the complete distribution grid. If the effect is negligible the new topology is associated with the existing fault level range and existing settings. In case of a significant impact on the existing fault levels, e.g. new level is outside of the existing range, new settings may be introduced for the new topology. The information exchange is realized by using the publisher/subscriber model of standard IEC 61850. Every major change in the network topology such as adding a new CB will require an automatic or manual re-configuration of the entire system.

Figure 3A:
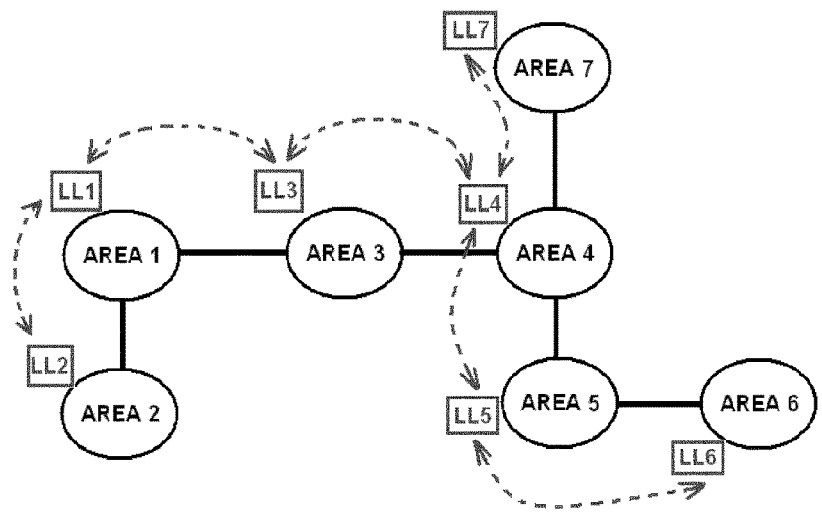
FIG. 3a shows an exemplary communication between the protection areas in radial topology according to the present invention.
Figure 3B:
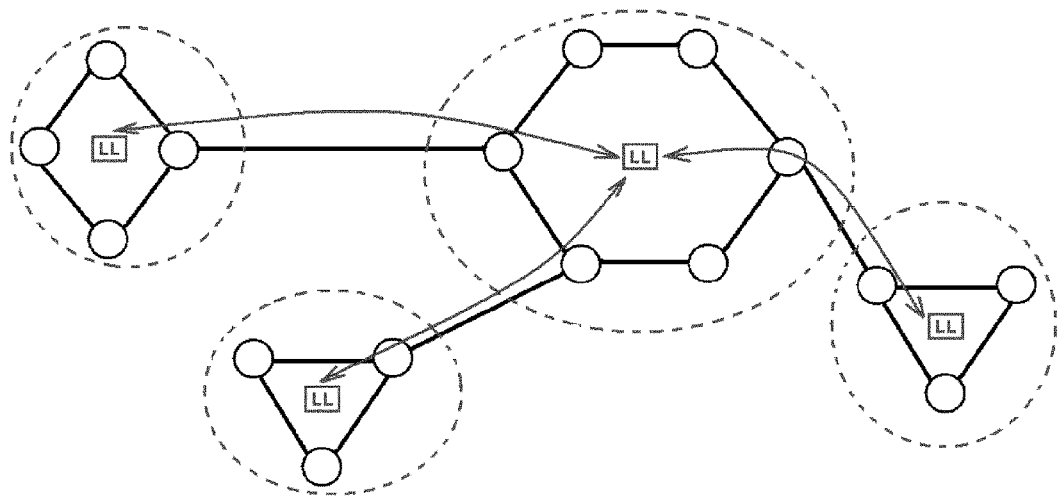
FIG. 3b shows an exemplary communication between the protection areas in multiple closed loops connected via radial lines, according to the present invention.

The above embodiment allows that the information about topological changes propagate through the whole active distribution grid as a varying short circuit power level without a need to communicate a status change of a specific circuit breaker to a central controller. It is a significant improvement for grids with a large number of switches. As shown in FIGS. 3a and 3b, the propagation of the changes is performed sequentially, e.g. from Area 1 to Area 3, and then from Area 3 to Area 4. In other words, the change in Area 1 is not directly communicated to Area 4. That is the short circuit level change in Area 1 will be taken into account when re-calculating the short circuit level of Area 3, and the re-calculation of the short circuit level of Area 4 considers the re-calculated short circuit level of Area 3 but not the short circuit level calculation of Area 1.

Figure 4:
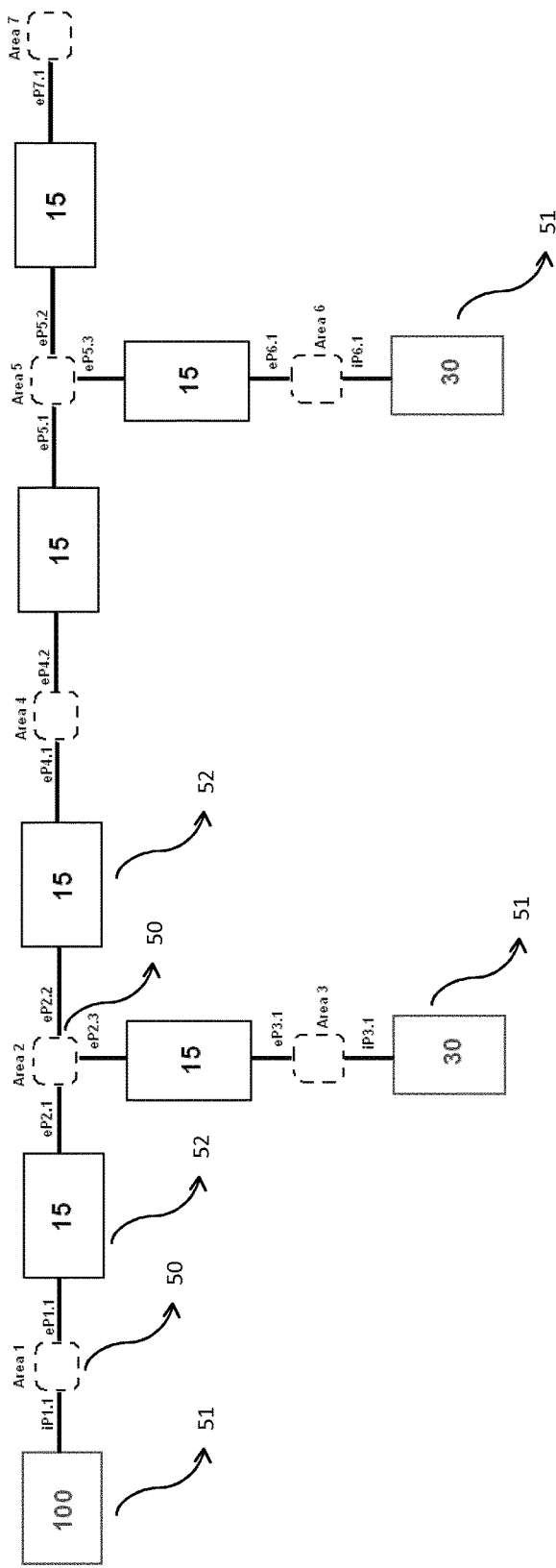
FIG. 4 schematically shows an MVA diagram of an exemplary radial active distribution network according to the present invention.

FIG. 4 shows an MVA diagram of an exemplary radial active distribution network. The network comprises seven areas marked with dashed lines, with internal and external ports. The boxes at the bottom and at the left side indicated with 51 represent fault current sources, i.e. utility grid and local generators, and the boxes indicated with 52 represent passive elements which interconnect different protection areas 50. We assume only passive loads which do not contribute to a fault level so it is not considered in the diagram. The invention is anyway applicable also to networks with the presence of active loads such as motors, if such loads are considered as generators in that their short circuit contribution is accounted for in the calculation. The values inside blocks indicate a short circuit contribution, i.e. increase of short circuit power in boxes 51 and de-rating, i.e. decreasing of short circuit power in boxes 52 of each element and are expressed in MVA.

Each connection line has two switches at both sides which are monitored and controlled by the LL form the closest protection area. The LL controller is a standalone unit with a communication module and CPU and memory. The CPU is used to run a program, e.g. a programmed logic software, and memory stores mapping between short circuit levels and settings for each local protection device. Each area communicates only with the direct electrically connected neighbors.

Figure 5:
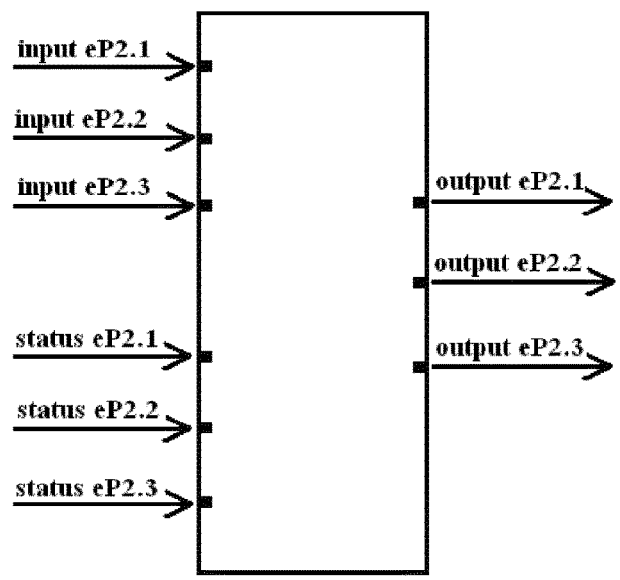
FIG. 5 schematically shows the terminals involved in the communication according to the present invention.

FIG. 5 shows for example that the LL controller in area 2 has the following inputs and outputs: 3 inputs from areas 1, 3 and 4 to receive contribution in MVA to internal faults in the area 2; 3 binary inputs to indicate a status of local, i.e. 0=open and 1=closed, switches; 3 outputs to areas 1, 3 and 4 to send area's 2 contribution in MVA to external faults in areas 1, 3, 4.

Figure 6:
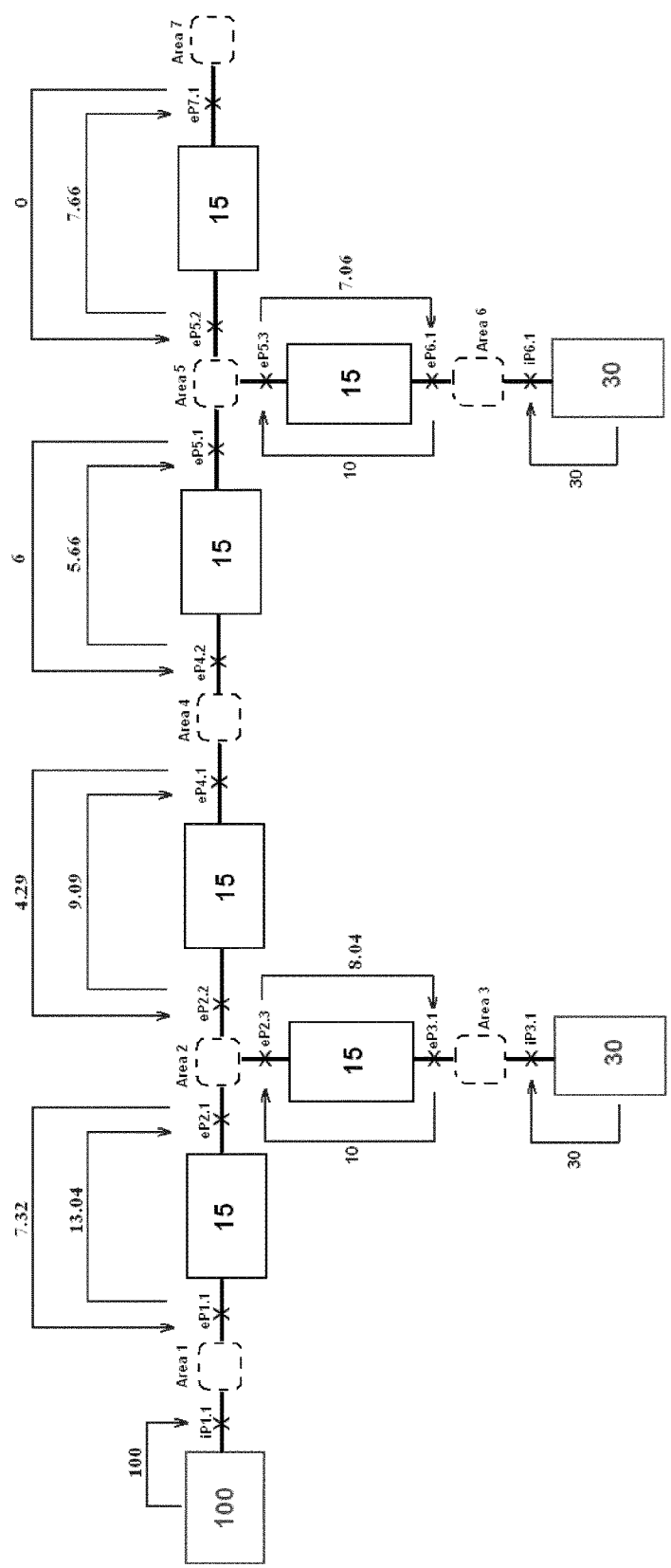
FIG. 6 schematically shows the use of MVA propagation method in an exemplary distribution network.

FIG. 6 summarizes MVA values communicated between the areas in case when all switches, i.e. ports, are closed. For example, the contribution of Area 1 to Area 2 is calculated as a serial connection of two elements box 51 with 100 MVA and box 52 with 15 MVA using equation (1):

$$\text{cascade} \rightarrow \frac{100 \cdot 15}{100 + 15} = 13.04 MVA$$

The result is indicated as a number on top of the arrowed lines showing the contribution from Area 1 to Area 2. When all the contributions to Area 2 from all the three ports are calculated, they must be put in parallel, making a global summation using equation (2):

$$\text{parallel} \rightarrow 13.04 + 4.29 + 10 = 27.33 \text{ MVA}$$

The short circuit power level in each protection area is given by a sum of all inputs from external and internal ports multiplied by a status value (1=closed, 0=open) of local switches. This multiplication is done to neglect the contribution of the neighboring area if the physical connection is open. For example, the area 2 has the following short circuit power:

$$MVA_{Area\_2} = StVal_{eP2.1} MVA_{eP2.1} + StVal_{eP2.2} MVA_{eP2.2} +$$
$$StVal_{eP2.3} MVA_{eP2.3}$$
$$= 1*13.04 + 1*4.29 + 1*10 = 27.33 MVA$$

Multiplying the MVA value, i.e. sent or received, by the status of corresponding switch, it's possible to compute a short circuit level in each area of the system, according to topological changes. For example, if the microgrid is isolated from the utility grid and run as an island with two local generators (switch eP2.1 is open), the area 2 will have a new MVA level as following:

$$MVA_{Area\_2} = StVal_{eP2.1}MVA_{eP2.1} + StVal_{eP2.2}MVA_{eP2.2} +$$
$$StVal_{eP2.3}MVA_{eP2.3}$$
$$= 0*13.04 + 1*4.29 + 1*10 = 14.29 MVA$$

Figure 7:
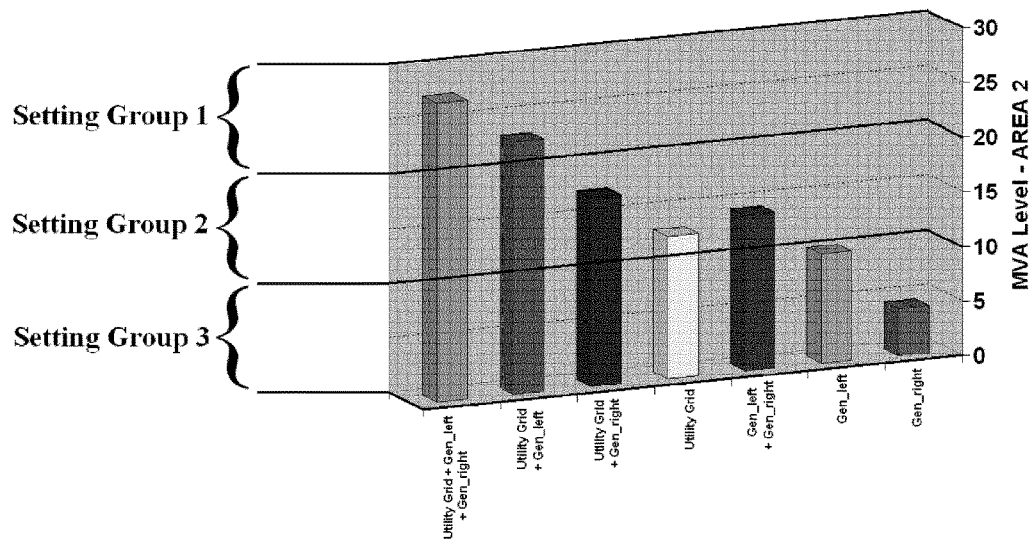
FIG. 7 schematically shows the short circuit power levels in protection area 2 illustrated in FIG. 4 and corresponding protection setting groups according to the present invention.

In this case the LL in the protection area 2 will recognize a decrease of the available short circuit power from 27.3 to 14.3 MVA. The LL will check if the settings of local protection devices are not compromised. The check is done by the program, e.g. the PLC program, which compares the setting group number which is associated with the binary encoded actual topology and the actual setting group read from the device. As it can be seen in FIG. 7 the LL will find that setting group 1 (correspond to MVA level of 27.3 MVA) of all protection devices must be switched to setting group 2 (correspond to MVA level 14.3 MVA). Finally, the command is send to protection devices to implement the change. This example considers switching between off-line calculated settings.

The short circuit level is always known in the entire system and the LL of each area can update settings of protection devices inside the area either according to existing rules or real-time calculations. Each specific setting or settings group correspond to a specific range of available short circuit power levels, i.e. to a specific network topology.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. Method of protecting a power distribution network with distributed energy resources and a line interconnecting a first busbar and a second busbar, each busbar being connectable, by means of switching devices adjacent to the busbar, to the line and to loads or generators, the method comprising the steps of:
   identifying a first and a second protection area comprising respectively the first and the second busbar, protected respectively by a first and a second protection device, and being delimited by the adjacent switching devices;
   assigning a first and a second logic controller to the first and the second protection area, respectively;
   evaluating, for an initial grid topology defined by a connect status of the switching devices, a first and second short circuit level for the first and second protection area, by the first and the second logic controller respectively;
   upon a change in connect status of a load or generator connectable to the first busbar, re-evaluating the first short circuit level by the first logic controller, and re-evaluating the second short circuit level based on the re-evaluated first short circuit level by the second logic controller; and
   adapting protection settings of the second protection device based on the re-evaluated second short circuit level.

2. Method of claim 1, further comprising the step of:
   communicating, by the first logic controller, the recalculated first short circuit level to the second logic controller via a communication channel.

3. Method of claim 1, further comprising the step of:
   adapting protection settings of the first protection device based on the re-evaluated first short circuit level.

4. Method of claim 1, wherein the distribution network further comprises a further busbar, and wherein the method further comprises the steps of:
   identifying a further protection area comprising the further busbar, protected respectively by a further protection device, and being delimited by the adjacent switching devices;
   propagating the step of re-evaluating of the short circuit levels, upon a change in connect status of lines, loads or generators connectable to the first and the second busbar; and
   aggregating the adaptation of the protection settings of the first, the second, the further protection device.

5. Method of claim 1, further comprising the step of:
   determining a group of settings for protection devices, wherein each setting corresponds to a range of the short circuit level.

6. Method of claim 5, wherein the step of adapting the protection settings is carried out by selecting the protection setting corresponding to the re-evaluated short circuit level from the group of settings.

7. Method of claim 1, wherein the protection settings are calculated in real time after configuration change to a new mode.

8. Method of claim 1, further comprising the steps of:
   upon a fault in the power distribution network, detecting fault direction for the first and the second protection area, and
   disconnecting the switching devices adjacent to the first busbar if the fault is inside of the first protection area, or
   disconnecting the switching devices adjacent to the second busbar if the fault is inside of the second protection area.

9. Method of claim 8, further comprising the step of:
   propagating the information about location of the fault to other switching devices on the boundary of the protection area where the fault is located.

10. Method of claim 1, wherein the first and the second logical controller are integrated with the first and the second protection device, respectively.

11. System of protecting a distribution network with a line interconnecting a first busbar and a second busbar, each busbar being connectable, by means of switching devices adjacent to the busbar, to the line and to loads or generators, wherein the system comprises:
    a first and a second protection area comprising respectively the first and the second busbar, protected respectively by a first and a second protection device, and being delimited by adjacent switching devices;
    a first and a second logic controller respectively connected to the first and the second protection area for calculating and recalculating the first and the second short circuit level;
    wherein the first and the second logic controller are adapted to evaluate, for an initial grid topology defined by a connect status of the switching devices, a first and second short circuit level for the first and second protection area, respectively;

wherein the first and the second logic controller are adapted to re-evaluate the first short circuit level, upon a change in connect status of a line, load or generator connectable to the first busbar, and to re-evaluate the second short circuit level based on the re-evaluated first short circuit level, respectively; and wherein the second logic controller adapts protection settings of the second protection device based on the re-evaluated second short circuit level.

12. System of claim 11, further comprising a communication line through which the first logic controller communicates the recalculated first short circuit level to the second logic controller.

13. System of claim 11, wherein it is further adapted to adapt protection settings of the first protection device based on the re-evaluated first short circuit level.

14. System of claim 11, wherein the distribution network further comprises a further busbar, and wherein the system is adapted to:

identify a further protection area comprising the further the further busbar, protected respectively by a further protection device, and being delimited by the adjacent switching devices;

propagate the step of re-evaluating of the short circuit levels, upon a change in connect status of lines, loads or generators connectable to the first and the second busbar; and aggregate the adaptation of the protection settings of the first, the second, the further protection device.

15. System of claim 11, wherein the first and the second logical controller are integrated with the first and the second protection device, respectively.

16. A computer program product including a computer readable medium containing therein computer program code adapted to carry out a method according to claim 1 when executed.

* * * * *